Patented May 26, 1942

2,284,576

UNITED STATES PATENT OFFICE 2,284,576

VULCANIZATION OF RUBBER

Paul C. Jones and Roger A. Mathes, Akron, Ohio, assignors to The B. F. Goodrich Company, New York, N. Y., a corporation of New York No Drawing. Application February 8, 1939, Serial No. 255,355

4 Claims. (Cl. 260—786)

This invention relates to the vulcanization of rubber, and to rubber compositions vulcanized in the presence of the accelerators herein described.

It has long been known that rubber may be vulcanized in reduced times in the presence of materials commonly called accelerators. It is an object of this invention to provide a new and exceedingly effective class of accelerators.

It has previously been observed that the class of compounds known as 2-mercaptothiazolines, of which the simplest member has the structural formula

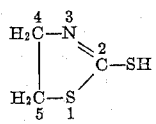

are poor accelerators of vulcanization.

We have disclosed in our copending application Serial No. 255,358, filed February 8, 1939, that 2-mercaptothiazolines are good accelerators when employed in the presence of carboxylic acids and their metallic salts.

We have now discovered that quaternary ammonium salts of 2-mercaptothiazolines are excellent accelerators of vulcanization, even in the absence of any carboxylic acid. The accelerators of this invention all contain the structure

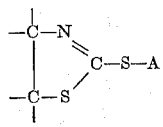

wherein A is a quaternary ammonium group. The quaternary ammonium portion of the molecule may be made by reacting hexamethylenetetramine, hexaethylidenetetramine, triethanolamine, trimethylamine, N-substituted morpholines, quinoline, pyridines, acridines, etc. with alkyl or aralkyl halides such as methyl iodide or benzyl chloride, halogenated ketones such as 1-chlor 2-butanone, or halogenated thiazoles, such as 2-chlorbenzothiazole or 6-nitro 2-chlorbenzothiazole. Thus benzyl chloride and hexamethylene tetramine may be reacted to form benzyl hexamethylenetetrammonium chloride, which in turn reacts with the sodium salt of 2-mercaptothiazoline in water solutions to give in almost quantitative yield of the benzyl hexamethylenetetrammonium salt of 2-mercaptothiazoline.

As an illustration of the accelerating power of the quaternary ammonium salts of 2-mercaptothiazolines, the following rubber compositions were prepared:

|  | Composition | |
|---|---|---|
|  | A | B |
| Rubber | 100.0 | 100.0 |
| Zinc oxide | 5.0 | 5.0 |
| Sulfur | 3.5 | 3.5 |
| Benzyl hexamethylenetetrammonium salt of 2-mercaptothiazoline | 1.0 | 1.0 |
| Lauric acid | 0 | 3.0 |

When these compositions were cured in a heated mold for varying times at 287° F. compositions having the following tensile strengths in lbs./in.² and elongations in percent were obtained:

| Time of cure in minutes | Composition | | | |
|---|---|---|---|---|
|  | A | | B | |
|  | T | E | T | E |
| 15 | 3,450 | 885 | 3,820 | 835 |
| 30 | 3,795 | 855 | 4,200 | 795 |
| 60 | 3,750 | 810 | 4,050 | 715 |

It will be observed that although the lauric acid had a slight activating effect, the benzyl hexamethylenetetrammonium salt of 2-mercaptothiazoline was itself an excellent accelerator. Similar results may be obtained by employing as accelerators other quaternary ammonium salts of 2-mercaptothiazolines, either with or without activators.

Although the use of the accelerators of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc. may be vulcanized in the presence of the accelerators herein described. The accelerator may be incorporated in the rubber by mastication, milling, or any similar process, or in the case of latex, rubber cement, or any other natural or artificial dispersion or solution of rubber by simply dissolving or suspending the accelerator therein.

The vulcanization may be performed in other manners than that particularly set forth in the specific examples; specifically, rubber compositions may be heated in the presence of sulphur or selenium in hot air, steam, hot water, etc.

It is to be understood that the term "a rubber" is employed in the appended claims in a generic sense to designate those rubbery materials which are vulcanizable with sulfur, including caoutchouc, balata, gutta percha, latex, rubber isomers, or synthetic rubber whether or not admixed with pigments, fillers, softeners, antioxidants, or other accelerators, etc., but not including materials incapable of vulcanization by reaction with sulfur.

While we have herein disclosed specific embodiments of our invention, we do not intend to limit ourselves solely thereto, for it will be obvious to those skilled in the art that many modifications such as using other materials having equivalent properties and varying the proportions of materials used are within the spirit and scope of the invention as defined in the appended claims.

We claim:

1. The process which comprises vulcanizing a rubber in the presence of a salt in which 2-mercaptothiazoline is combined with a quaternary ammonium compound derived from a heterocyclic nitrogen base.

2. The process which comprises vulcanizing a rubber in the presence of the benzyl hexamethylenetetrammonium salt of 2-mercaptothiazoline.

3. A rubber which has been vulcanized in the presence of a salt in which 2-mercaptothiazoline is combined with quaternary ammonium compound derived from a heterocyclic nitrogen base.

4. A rubber which has been vulcanized in the presence of the benzyl hexamethyleneteterammonium salt of 2-mercaptothiazoline.

PAUL C. JONES.
ROGER A. MATHES.